(12) United States Patent
Jaeger

(10) Patent No.: US 7,017,124 B2
(45) Date of Patent: Mar. 21, 2006

(54) METHOD FOR CONTROLLING ELECTRONIC DEVICES USING DIGITAL RECALL TOOL

(76) Inventor: Denny Jaeger, 6120 Valley View Rd., Oakland, CA (US) 94611

( * ) Notice: Subject to any disclaimer, the term of this patent is extended or adjusted under 35 U.S.C. 154(b) by 721 days.

(21) Appl. No.: 10/053,075

(22) Filed: Jan. 18, 2002

(65) Prior Publication Data

US 2002/0109724 A1    Aug. 15, 2002

Related U.S. Application Data

(63) Continuation-in-part of application No. 09/880,397, filed on Jun. 12, 2001, now Pat. No. 6,883,145, which is a continuation-in-part of application No. 09/785,049, filed on Feb. 15, 2001.

(51) Int. Cl.
   *G06F 3/00* (2006.01)
(52) U.S. Cl. .................. 715/863; 715/788; 715/798; 715/835; 715/856; 715/517
(58) Field of Classification Search ................ 715/863, 715/788, 798, 835, 856, 517; 345/619, 443
   See application file for complete search history.

(56) References Cited

U.S. PATENT DOCUMENTS

| | | | |
|---|---|---|---|
| 4,949,388 A | | 8/1990 | Bhaskaran |
| 5,010,500 A | * | 4/1991 | Makkuni et al. ............ 715/863 |
| 5,121,442 A | | 6/1992 | Tocawa et al. |
| 5,148,522 A | | 9/1992 | Okazaki |
| 5,301,336 A | | 4/1994 | Kodosky et al. |
| 5,572,651 A | * | 11/1996 | Weber et al. ............... 715/863 |
| 5,583,542 A | | 12/1996 | Capps et al. |
| 5,583,946 A | | 12/1996 | Gourdol |
| 5,636,297 A | * | 6/1997 | Eller et al. .................. 382/293 |
| 5,666,113 A | | 9/1997 | Logan |
| 5,724,492 A | | 3/1998 | Matthews et al. |
| 5,825,368 A | * | 10/1998 | Wilks ......................... 345/440 |
| 5,841,906 A | | 11/1998 | Saito |
| 5,909,211 A | | 6/1999 | Combs et al. |
| 6,034,679 A | | 3/2000 | McGrath |
| 6,097,392 A | | 8/2000 | Leverle |
| 6,335,740 B1 | | 1/2002 | Tanaka |

OTHER PUBLICATIONS

Microsoft Corporation. "Microsoft Paint Version 4.0 Screenshots". 3 pages.*

* cited by examiner

*Primary Examiner*—John Cabeca
*Assistant Examiner*—Michael Roswell
(74) *Attorney, Agent, or Firm*—Harris Zimmerman

(57) ABSTRACT

In an electronic device that accepts drawn graphic entries and includes a screen display, a tool for storing and recalling elements displayed on the screen enables a user to draw a simple diagonal line to establish where an element is to be placed onscreen and the definition of the element. The length and slope of the diagonal line determines outer dimensions which are used to define the size of the element displayed. Each element is assigned to a respective line specifier, such as line color. A plurality of zones may be defined on the screen display, each zone having unique specifier assignments for the diagonal lines. A plurality of electronic devices may be connected to a communications network, and elements recalled on one device may be transmitted at the same time to any other device. Elements that are functional objects may be transmitted in this manner, and actualized and operated independently by the recipient devices.

43 Claims, 17 Drawing Sheets

METHOD FOR CONTROLLING ELECTRONIC DEVICES USING DIGITAL RECALL TOOL

REFERENCE TO RELATED APPLICATION

This application is a continuation-in-part of U.S. patent application Ser. No. 09/880,397, filed Jun. 12, 2001 now U.S. Pat. No. 6,883,145, which is a continuation-in-part of U.S. patent application Ser. No. 09/785,049, filed Feb. 15, 2001, for which priority is claimed. The entireties of the prior applications are incorporated herein by reference.

BACKGROUND OF THE INVENTION

The copending patent application captioned above describes a graphical user interface for a machine having a screen display. A significant feature of the interface is that it provides the means for hand drawn entry of on-screen objects which may be associated with functions, files, connections, and other objects or actions accessible by the system to carry out the user's desired purpose, whatever it may be. A fundamental aspect of this interface is the ability to carry out commands and actions in real time corresponding to the hand drawn inputs as they are applied to any on-screen object, including (but not limited to) objects representing files (text, data, sound, video, graphics, photos, and the like), functional devices (audio processing, video processing, graphic and photo processing, text editing, data processing, internet communications, test equipment, medical devices, and the like), and interconnecting arrows and lines that link these files and functional devices in on-screen arrangements that are drawn by the user to accomplish desired tasks. The prior related applications also introduce arrow logics as a method for inputting transactions involving objects displayed onscreen through the use of arrows and lines drawn between such objects.

It is noted that approximately 26% of the population of the U.S. and approximately 5% of the world population (including the U.S. figure) own a PC today. These statistics show that although current times are widely known as the computer age, ownership and, to a significant extent, the use of computers is the exception rather than the rule, in much of the world, even the developed "first" world.

One possible reason for the reluctance of some to embrace the PC is a difficulty for them to feel comfortable or familiar with many of the PC's required operations. In other words, the PC requires a certain learning process associated with its operating system ("OS") and third party software that run on this OS. The operation of a given OS is determined by the manufacturer of the OS and, like it or not, users must comply with the means, methods, and rules which the OS requires to be followed, even if this operation is not intuitive for the users.

This same model applies to virtually every computer software program that runs on a PC, from graphics and video software to text software to business software. Each of these software programs carries with it an instruction manual that inexorably increases in size and complexity with each new software update.

Pull Down Menus

Typically, to operate a computer, i.e., a PC or Mac or its equivalent ("PC"), pull down menus, task bars, icons, and the like are provided by the software application and required to be used. Pull down menus have proven to be a deterrent to a myriad of would-be computer users. Pull down menus started out nearly two decades ago as simple lists of functions. But today, as more and more functionality has been added to computers, pull down menus have become complex worlds unto themselves. In fact, many a user has thrown up his hands in frustration because a certain software program, with which these users had developed great proficiency and familiarity, can no longer be easily operated, because the pull down menus were changed in a new software update. Such changes could include eliminating familiar items, new locations of menus entries, new categories where controls, features, and tools are grouped in a new way, the changing of names of menu items, etc. To many users this phenomenon creates difficulty because "nothing is familiar anymore". Therefore the very familiarity that supported their proficiency is removed, all in the name of progress called a software update.

The Look of a Software Screen

Another important factor in maintaining a user's mastery and familiarity of certain OS or other software programs is the "look" of the screen when operating this software. The "look" can be more than an appearance of graphics. This "look" can affect in a greater or lesser degree the very operation of the software itself. Things as simple as font changes (new font sizes, styles, etc.) or different graphic layout schemes, or in some cases, changes in color schemes can all have negative affects on both the ability of a new user to adapt to or develop a proficiency in any given software or the ability of experienced users of certain software to continue their proficiency beyond and into one new software update after another, where the very "look" that was relied upon as a familiar and efficient environment is changed time and again in software updates.

Thus there are two general issues cited here affecting users of software:

1) New users may not embrace, adapt to, or accept a certain software or OS because its "look and feel" and its operation is not easily understood or assimilated by them.

2) Existing users (including experienced users) may find their proficiency so compromised by changes in the software from one update to another that their ability to "keep up" is compromised and the usefulness to them of certain software becomes diminished.

SUMMARY OF THE INVENTION

The invention generally comprises a graphic tool, termed herein the DRT (Digital Recall Tool) that enables a user to draw a simple diagonal line to establish at least three things:

a) Where an element is to be placed;

b) How big the element is to be, namely its width and height;

c) What is the definition of element; that is, is it a layout, a control panel, a piece of text, a software tool, a series of operation devices, i.e., faders, knobs, joysticks, switches, etc.

In addition, contexts or zones can be applied to the DRT to further define what the element will be when a diagonal of a certain color is drawn within a particular context or zone.

The DRT may have multiple assignments made to it. These assignments can be as simple as a single graphic object or a single word in text, to very complex graphic or device control panels or layouts or complex presentation documents, which may include pictures, animation, sounds that playback and can be edited or mixed, or hand drawn graphics, or typed text or even video.

With a single stroke of a pen or mouse or any other input device, the DRT can be used to place onscreen anything that has been assigned to it. The length of the stroke determines the width or length of each object that makes up the layout, controls, presentation, etc. ("elements"), that is being recalled by the DRT. The slope of the stroke determines the height or vertical size of the same.

If the DRT stroke equals a distance that is less than the original width of the element that is being recalled, the element is automatically resized proportionately (each individual graphic object, text, and/or device making up the element is proportionately resized). If the DRT stroke equals a distance that is less than the height of the element that is being recalled, the height of each individual item comprising the element is proportionately resized to a smaller height.

There are various ways that the drawing of a simple DRT line can produce (recall, place onscreen) an assigned element (after DRT is turned on and a line specifier is selected):

1. A user draws a line and on the mouse up click or when the pen is lifted from the display, the element appears automatically resized proportionately according to the length and slope of the line drawn.
2. As a user draws a line on a display, the element "flows" out of the pen or mouse stroke. What this means is that "as the stroke occurs", the element is revealed as though its items are flowing out of the mouse cursor or pen in real time. In this case, the drawer of this line does not see a line at all. What is seen is the revealing of ever increasing proportional resizing of the element until the mouse or pen stops drawing.
3. The user draws a line and on the mouse up click or when the pen is lifted from the display the specifier appears onscreen. The specifier is clicked or touched, and the element assigned to it appears onscreen.
4. The user selects "non-proportional" in the DRT info window. The user selects a line specifier, and then draws a line onscreen. On the up click or pen lift off the element assigned to the selected line specifier appears onscreen in its full original size, so that the size of the recalled element is not affected by the size of the line drawn onscreen.

Note: if under scenario 2 above, the pen or mouse does not initiate a mouse up click or its equivalent, the element can be immediately resized by continuing to drag the pen or mouse down, up, left or right. In this case, the element will appear to proportionately stretch to change the proportionate size of each item that makes up the element. Once the pen is lifted from the display or the mouse up click occurs, the element appears onscreen in a form that cannot be altered by drawing a DRT line. In fact, drawing a second DRT line may produce another copy of the element, depending upon which DRT color is selected. The size of this second element, of course, will be determined by the length and slope of the second drawn line.

Note: If the DRT is turned "off", drawing a line will not recall an element stored in the DRT tool. Rather, merely a line will be drawn on the screen.

Engaging the DRT Function

One way to engage the function of this invention is to draw a graphic that a software system recognizes as an input command for a DRT switch. Then this DRT switch is touched to turn it "on" and to activate the DRT function. Touching this switch again will turn it "off" and deactivate the DRT function. An example of a drawn DRT command is drawing a rectangle inside of a rectangle. The drawing of this object would result in the automatic recognition and creation of a DRT switch, which in turn could be touched (turned on) to activate the DRT function.

Likewise, a verbal command can be used to engage the DRT function. Such a spoken command could be "DRT" or "Digital Recall Tool", or any designated nickname for this function, like, "Slash", etc.

Advantages of the DRT

Some of the advantages of the DRT over the prior art are:

Typical PC pull down menus can be reduced or eliminated. The DRT can be enlisted to access any element, including software tools, images, files, functions, formats, views, tables, windows, devices, layouts, software applications, etc., that are typically accessed by various pull down menus, icons, etc., in a PC environment.

Single Stroke Recall. The DRT enables a user to draw a single stroke anywhere onscreen, which could take less than 1 second, to access anything that is stored in the DRT. This single stroke can also be used to determine the height and width (outer dimensions) of whatever is being recalled. In other words, the longer the stroke, the wider the element being recalled; the steeper the slope, the greater the height of the element being recalled. So, users can not only determine what they recall, but also the size and proportion of what they recall, as well as its location. Again, this can all be determined with a single stroke onscreen.

Entire control panels or layouts can be assigned to a DRT. Fully functioning controls and operational devices or systems, i.e., an oscilloscope, a video playback device, animation or automation controls, an entire audio mixing console or video editing system, medical apparatus, etc., can be placed anywhere onscreen, with any proportional size, with a single stroke of a pen or mouse.

User-Defined Controls Through Drawing. Users can design their own controls, layouts, presentations, web pages, letters, brochures, etc. ("elements"), and then assign any number of these "elements" to a DRT. By recalling these "elements" at will, users can control the "look", functionality and operability of their onscreen environment. With single DRT strokes of a pen or mouse, users can utilize the DRT to quickly recall any number of user-defined "elements". By this method users can completely control the simplicity or complexity of their onscreen world.

Control of "Element" Placement and Its Size Through Drawing. The DRT can be used to create a space of any height and width that can determine the width of text that can be typed. This DRT "space" will cause text to be automatically wrapped when it "hits" the right side of this DRT space. Thus text blocks of any width can be setup with the stroke of a pen or mouse—drawing a diagonal with the DRT function "on". This approach can be used, e.g., to quickly setup up columns of text for magazine or brochure layouts.

Drawing DRT lines to Place Pictures and Video. The DRT can be used to place pictures onscreen in and around text. The simple drawing of a DRT stroke onscreen can place a picture and at the same time determine its height and width. The same approach can be used to place a video viewing screen anywhere on a display.

DRT "Zones". The DRT can be programmed to recall a completely different element when a DRT is drawn in different "zones" on a display screen. In other words, the DRT can be programmed to recognize different areas of a display as being separate and distinct sub-sections, each sub-section having a respective set of definitions of its DRT elements. When the same DRT stroke is drawn in each of these sub-section areas, the element that is recalled can be completely different.

DRT Auto Sequencing. The DRT can be programmed to automatically sequence the recalling of elements when a same colored DRT line is drawn in the same "zone". For example, drawing six blue DRT lines in the same "zone" could yield six different elements being recalled sequentially and placed in this zone. The six elements would be automatically sequenced, each next element appearing with each next blue DRT line drawn in the same "zone".

Software Upgrades Can't Create an Unfamiliar Environment. Since users can use the DRT to customize their onscreen world and since users can determine what is drawn and where they draw it and what this recalls, software updates cannot place controls in unwanted or unfamiliar locations. Users determine the placement of controls, tools, text, pictures, etc., by drawing onscreen. These same users determine what colors are assigned to what elements. If "zones" are being used, users determine the size and shape of these "zones" and how they are going to be used. In short, users are controlling their onscreen environment by what they draw, NOT by what a manufacturer puts into a menu or task bar, or its equivalent.

BRIEF DESCRIPTION OF THE DRAWING

FIG. 17 is a screen view showing the DRT list of assignments to the color blue, with Zones switched ON.

DESCRIPTION OF THE PREFERRED EMBODIMENT

Figure 1A:
FIGS. 1A–1B are a sequence of screen views showing an input drawn to evoke the DRT tool, and the resulting DRT switch used to turn the DRT function on and off.

The invention generally comprises a graphic tool that is intended to be used in conjunction with a computer or any electronic device that employs a screen display as an interface with the operator of the device. (In this application, the term "screen display" is used to denote any graphic that is visible on a computer display screen or its equivalent.) The graphic tool, termed herein the DRT (Digital Recall Tool), enables a user to draw a simple DRT line to call forth graphical elements that represent useful objects.

In this application, the following terms may be found, and are defined thusly:

line specifier (assignable specifier)—a visible characteristic, such as line style, color, texture, symbol, and alphanumeric character, which may be used to distinguish DRT lines and represent one or more elements which have been assigned to a line specifier.

assignment—the association of an onscreen element with a DRT line that is identified by its line specifier.

element—an onscreen object (i.e., email, console, picture, text file, video clip, web page link, etc.) that can be assigned to a DRT line.

occurrence—the drawing of a DRT line to recall the element assigned to the DRT line.

outer dimension—the overall height and width that are defined by the drawing of a single line. The length (which could be an average length or derived length) and angle or slope (which could be an average slope or derived slope) of such drawn line determines an "outer dimension". This outer dimension is not necessarily a visible graphic onscreen. But it can determine the overall size of any element that is recalled by the drawing of a DRT line.

Another way to derive the outer dimensions for an assigned element may be to select a menu entry that defines the size of the element to be recalled. Of course, this menu entry may be user-alterable.

electronic device—a computer, which includes laptops, desktops, hand held PDAs, cell phones and the like, and which also includes a computer logged onto the Internet. Electronic device also includes any electrical appliance that incorporates a microprocessor and display means.

functional object—a graphic that includes, at least in part, a functional device that can be operated by any means, including the manipulation of the graphic or associated graphics, verbal input, written input, typed input or any other input to a computer. Such functional object can be operated as almost any type of equipment, action, operation, cause, etc. Such functional object could include, but is not limited to any of the following: a switch, knob, joystick, fader, an audio player or editor, a video editor or player, an oscilloscope, a piece of medical equipment, an email, a web link, a network, a presentation, an animation, a sequence of events, etc.

behavior—indicates a graphic or its equivalent that includes at least one instruction, condition or action or its equivalent that can be applied to anything associated with that graphic. For instance, a rectangular perimeter could be a graphic, or it could have a behavior, such as functioning as a zone.

Figure 1B:

To enable the computer system to recognize a simple DRT line as a command to display the useful object(s), the system includes at least one method to invoke the DRT function. With regard to FIG. 1A, the user may draw a graphic that represents a DRT switch, such as a rectangle nested (drawn within) a larger rectangle. The system recognized this particular drawn graphic as a DRT switch command, and responds by displaying the DRT switch shown in FIG. 1B. Thereafter, touching (or mouse clicking, or the equivalent action) the DRT switch will activate the DRT function, and touching it again will turn off the DRT function.

Likewise, a verbal command may be used to engage the DRT function. Such a spoken command may be "DRT" or "Digital Recall Tool," or any designated nickname for this function, such as "Slash" or the like.

Figure 2A:
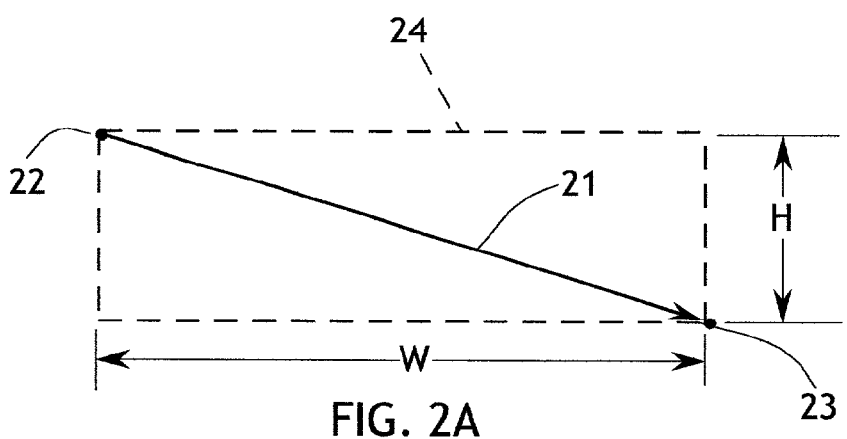
FIGS. 2A–2F depict the drawing of a diagonal DRT line and the resulting DRT element that is scaled according to the outer dimensions of the drawn line.

Whenever the DRT function is activated, the user may draw a DRT line, using a mouse, touch screen, pen, finger, or any other input device that enables drawing inputs. As shown in FIG. 2A, a diagonal line 21 is drawn from its origin 22 to any desired length and at any angle or slope to the tip 23 of the line. The horizontal width W and the vertical height H of the line 21 define outer dimensions which determine the overall size of any element recalled to the screen display, or its equivalent, by the drawing of this diagonal line.

Figure 2B:
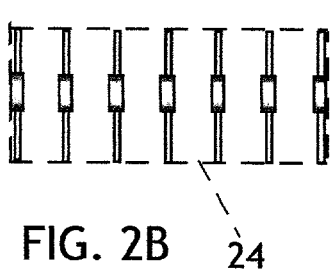
Figure 2C:
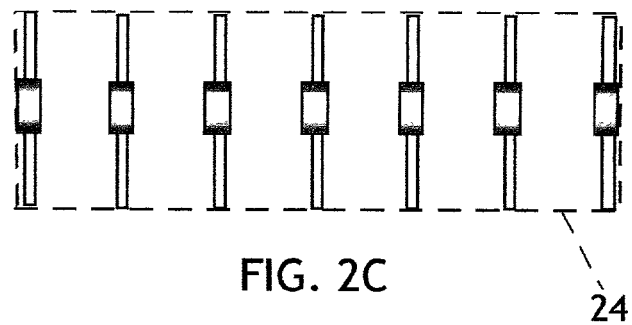

The type of element recalled by the drawing of a line onscreen may be set by the user or defined in other ways. For example, the DRT tool may be set to display an array of slider devices (faders), all of which may be set to be activated individually or collectively or in any combination. As shown in FIGS. 2B and 2C, the array of faders is scaled in size to fit the outer dimensions 24 of the drawn line—the size of these outer dimensions is set by the height and width of the diagonal line 21. Note that the size and spacing of the faders are scaled in proportion to the outer dimensions defined by the diagonal line 21. Furthermore, it should be noted that drawing the diagonal with a greater or lesser slope (which can in many cases be determined by the origin and end points of the line) would result in the fader array being displayed as wider or narrower and that all faders are displayed, regardless of the outer dimensions that are created by the diagonal line. Further note that an outline showing the perimeter of these outer dimensions is not necessarily visible to the user of this invention. In fact, for many applications it will be invisible and only the resulting size of the element (i.e., a row of faders as depicted in FIGS. 2B and 2C), assigned to a line's specifier, may be visible.

Figure 2D:
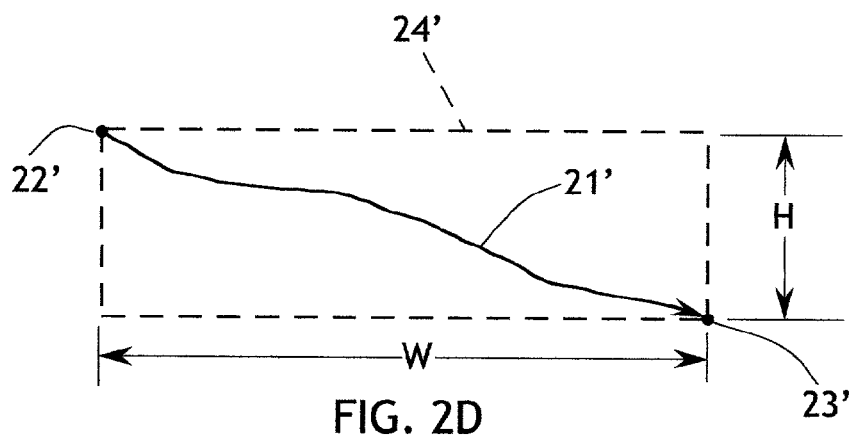

With regard to FIG. 2D, an actual hand drawn DRT line may comprise a somewhat erratic or irregular line 21'. The software detects the pen down origin 22' and the pen up end point 23', and sets the size of any element assigned to any assignable specifier selected as a line style. The size of this element is determined by measuring the length and slope of the line created between the two points 22' and 23'.

Figure 2E:
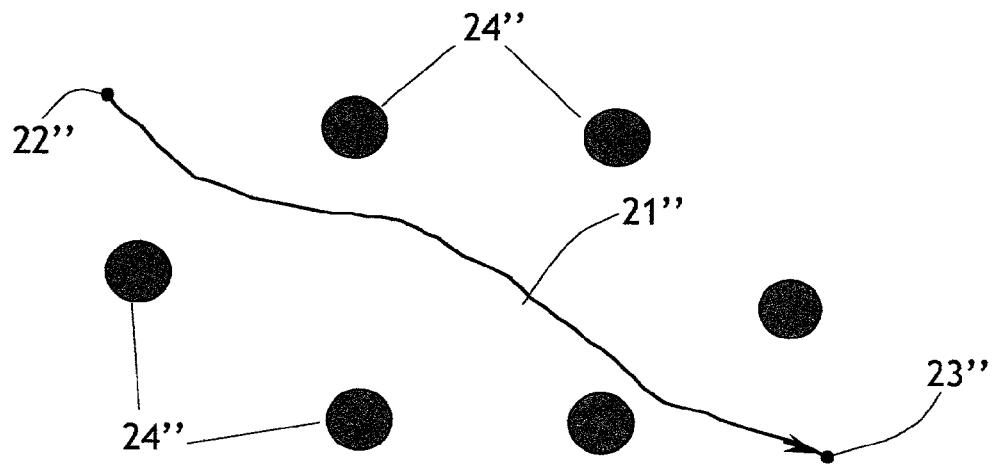

With regard to FIG. 2E, another example of a drawn DRT line determines the size of one or more elements assigned to that line's specifier. Even though line 21" is irregular, it still defines the outer dimensions for any and all elements that are assigned to its specifier. Such outer dimensions are determined by this length and slope of this line. The origin 22" and end point 23" are used to calculate the outer dimensions defined by line 21", irrespective of the irregularities of the line 21". Furthermore, line 21" is shown recalling an array of knobs 24". This element has been previously assigned to a line specifier which is first selected as a line style and then drawn as a DRT line. The size of this graphic element 24" is determined by the length and slope of the diagonal line 21".

Figure 2F:
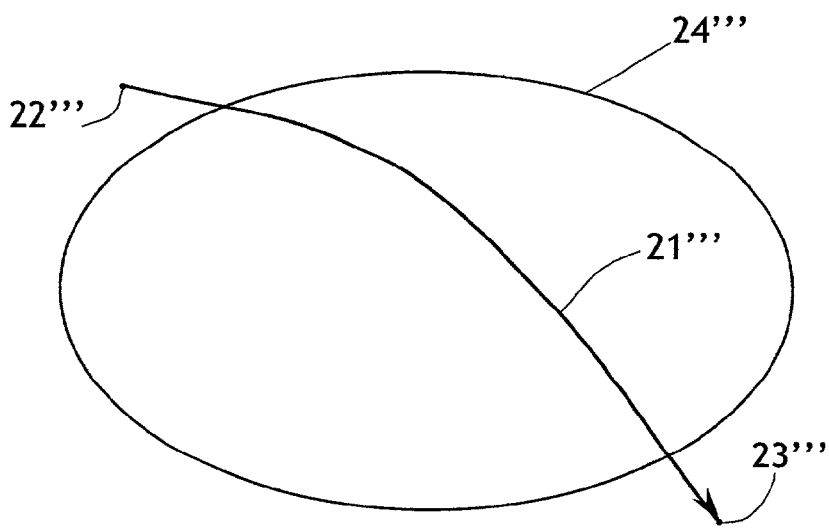

In the example of FIG. 2F, the recalled element comprises an ellipse 24''' having a width and height that is calculated from the length and slope of the drawn line 21'''

Note that the outer dimensions may be defined by any regular or irregular DRT line, as in FIGS. 2D–2F, not just a straight diagonal line; in many cases, the outer dimensions are portrayed with invisible borders, so that the only item that appears is the element that has been assigned and recalled and sized to conform to the outer dimensions.

A fundamental and powerful aspect of the DRT tool is that the user may assign a wide number and variety of elements to line specifiers that are selectable within the tool. These elements may include a function, action, operation, layout, control panel, series of devices as in a audio or video mixer/editor or test equipment, one or more hand drawn graphics, one or more pictures, one or more videos, any type of text (including letters, brochures, emails, books), one or more data files, and the like. Each element may be assigned to a different specifier in the DRT system, and any element may be selectively recalled by the user drawing a single stroke on the display in a line style, which could be a color, object, texture, type of geometric line (e.g., a dash, dotted or slotted line) that has been associated with the element that the user wishes to call forth.

Figure 3A:
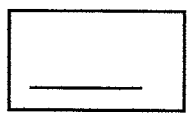
FIGS. 3A and 3B are a sequence of screen views showing an input drawn to evoke the onscreen inkwell for arrow logic functions.
Figure 3B:
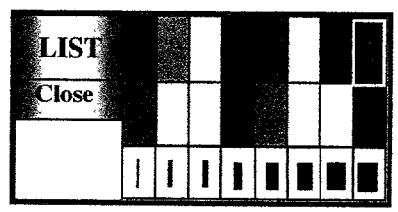

To assign an element to a color in the DRT system, the user first initiates an arrow logic, or its equivalent, as follows. With regard to FIG. 3A, the user may draw a graphic, such as a rectangle and a horizontal line therewithin, which is recognized as a command to display an onscreen arrow logic color/line palette, hereinafter termed "onscreen inkwell." As a result, the system provides the onscreen inkwell display of FIG. 3B, in which a variety of color choices and line width choices are displayed. The user then selects a color that is associated with an arrow logic that has a transaction defined to take the objects from which the arrow or line is drawn and place those objects in the object to which the arrow or line is drawn. In this example, the desired arrow logic color is green, and the selection of this color causes the inkwell to be outlined in green to confirm the selection. For a more detailed description of arrow logics, refer to the pending patent application Ser. No. 09/880,397, filed Jun. 12, 2001.

Figure 4:
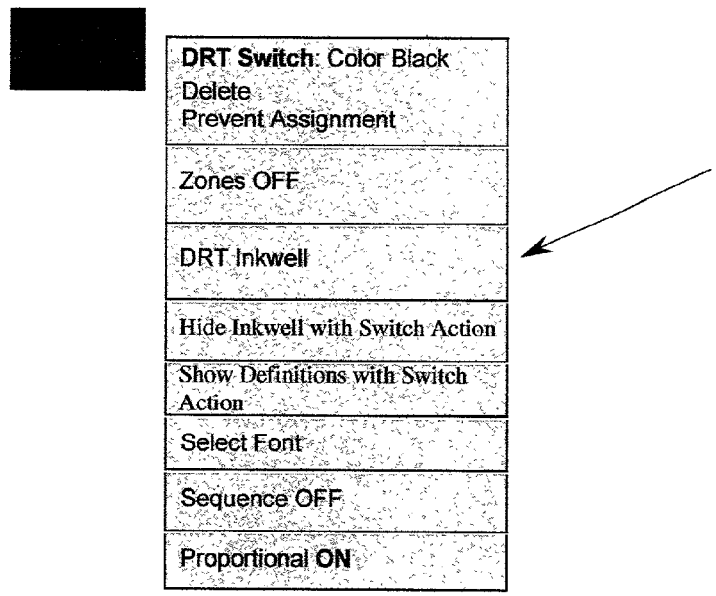
FIG. 4 is a screen view depicting a possible DRT Info Window.

Thereafter the user may click or touch the DRT switch to activate the DRT feature. As shown in FIG. 4, the DRT switch object then turns to green (or any other designated color). When the user right clicks (or double clicks, or double touches, or invokes the equivalent as a vocal command) on the activated DRT switch, the system responds by displaying an Info Window, as shown in FIG. 4. The Info Window presents a list of functions that may be selected to be activated. The user selects "DRT Inkwell", which elicits a display, shown in FIG. 5, that comprises a color palette (including a List switch) that comprises the DRT Inkwell.

Figure 5:
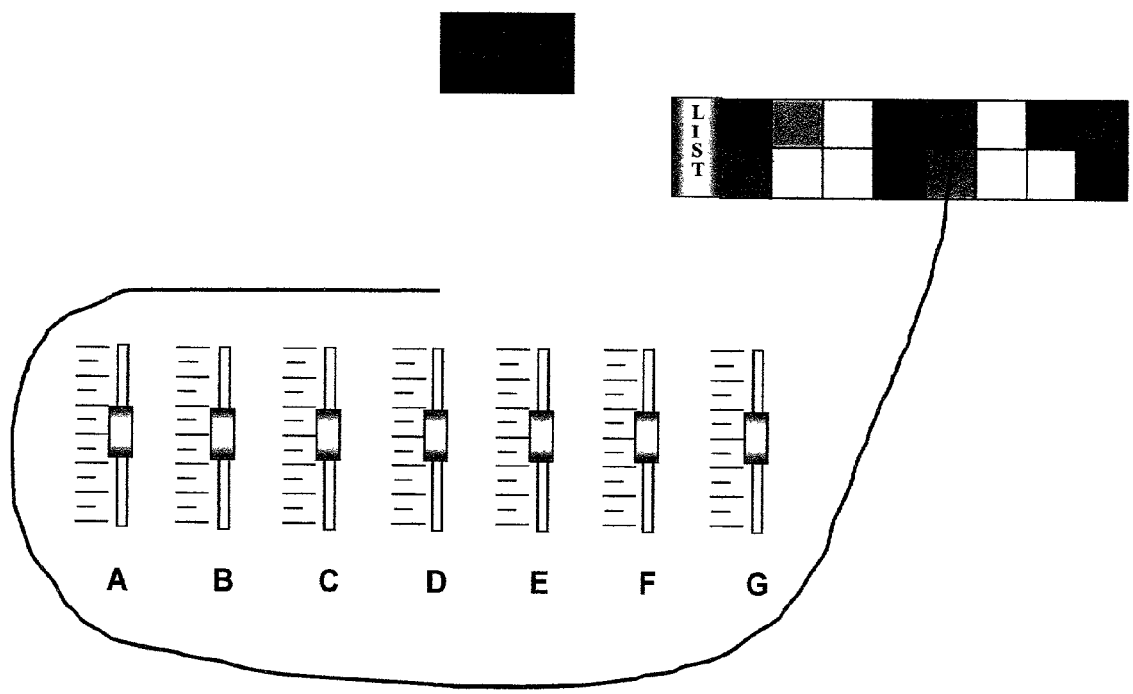
FIG. 5 is a screen view showing one technique for assigning elements to a DRT color selection.
Figure 6:
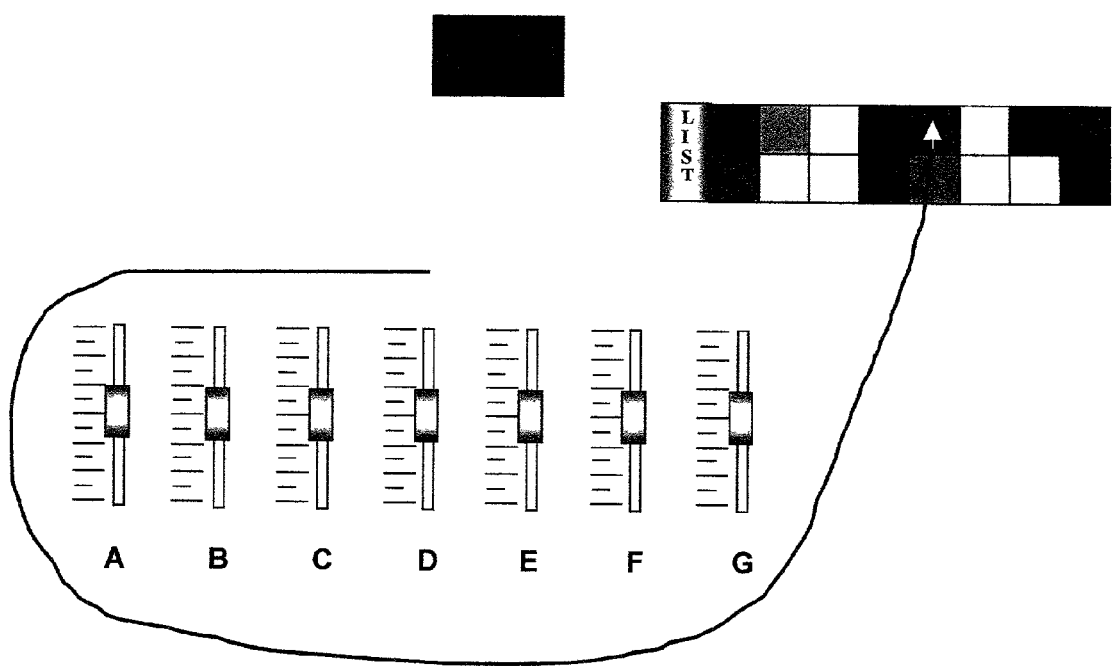
FIG. 6 is a screen view showing the assigned elements of FIG. 5 recognized by the DRT system.
Figure 7:
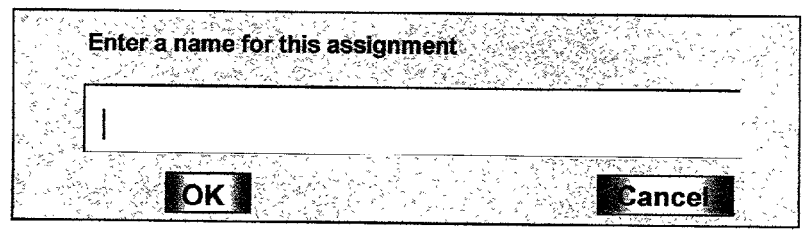
FIG. 7 is a pop-up window displayed to name a DRT assignment following the steps of FIGS. 5 and 6.

The user may then draw an arrow to select any onscreen object or plurality of objects, and direct these objects to one color presented by the DRT Inkwell, as shown in FIG. 5. The system responds by displaying a white arrowhead at the head end of the arrow, as shown in FIG. 6. The white arrow head indicates that the software recognizes the intended assignment to a color. When this arrowhead is clicked or touched, the software displays a pop-up window, as shown in FIG. 7, that prompts the user to enter a name for the DRT assignment that is being made. After a name is entered and the OK button is clicked, the system stores the assignment of the fader array to the color blue.

Thereafter, whenever the user activates the DRT system and selects the blue color and draws a line, the system will display the fader array that was assigned to the color blue, in proportion to the length and slope of the DRT line that is drawn.

Note: the difference between the onscreen inkwell and the DRT inkwell is that the onscreen inkwell is used to select a color for drawing for any non-DRT purpose onscreen. Whereas, the DRT inkwell is used to permit users to assign elements to individual colors and then recall those elements by drawing diagonal lines or their equivalent with a color selected from the DRT inkwell.

Another simple method for selecting and assigning an element to a DRT color is to first turn on the DRT system and call forth the DRT inkwell, then touch (or click) one of the DRT colors, and then touch (or click) the onscreen object that is to be assigned to the selected color. The system will recognize these inputs as a DRT assignment command, and will then display a pop-up window for naming the assignment, as shown previously in FIG. 7.

Figure 8A:
FIGS. 8A and 8B are a sequence of screen views showing, respectively, a technique for removing a color from the DRT inkwell, and the resulting rearranged color array.
Figure 8B:

The user may remove any color from the DRT inkwell. To remove a color from the DRT inkwell, the user right clicks (or its equivalent mechanical action or vocal command) on any color and selects "Delete" in its Info Window, or drags the color out of the inkwell into blank onscreen space and perform a mouse up click or a pen lift off, as shown in FIG. 8A. Upon this action, this color will be deleted from the DRT inkwell and will disappear from onscreen, and the inkwell will reconfigure itself to be contiguous, as shown in FIG. 8B.

Figure 9A:
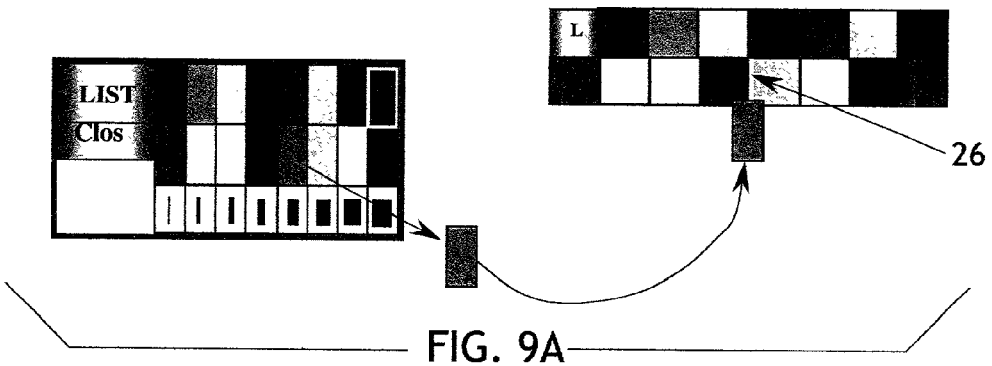
FIGS. 9A and 9B are a sequence of screen views showing, respectively, a technique for adding a color to the DRT inkwell, and the resulting rearranged color array.
Figure 9B:

To add a color to a DRT inkwell, the user clicks or touches and holds on a color rectangle in the onscreen inkwell (not the DRT inkwell), as shown in FIG. 9A. This will duplicate the color rectangle. Then the color rectangle (in this example, magenta) is dragged so it overlaps one of the color squares on the DRT inkwell. As this onscreen inkwell color rectangle is dragged over the DRT inkwell's color squares, a colored vertical line 26 indicates the point in the DRT inkwell where the onscreen color rectangle will be inserted between two existing color squares. In addition, the shape of the onscreen color rectangle will automatically change to match the shape of the DRT color squares when the pen is lifted from the screen, or upon the mouse up click, as shown in FIG. 9B.

Figure 10:
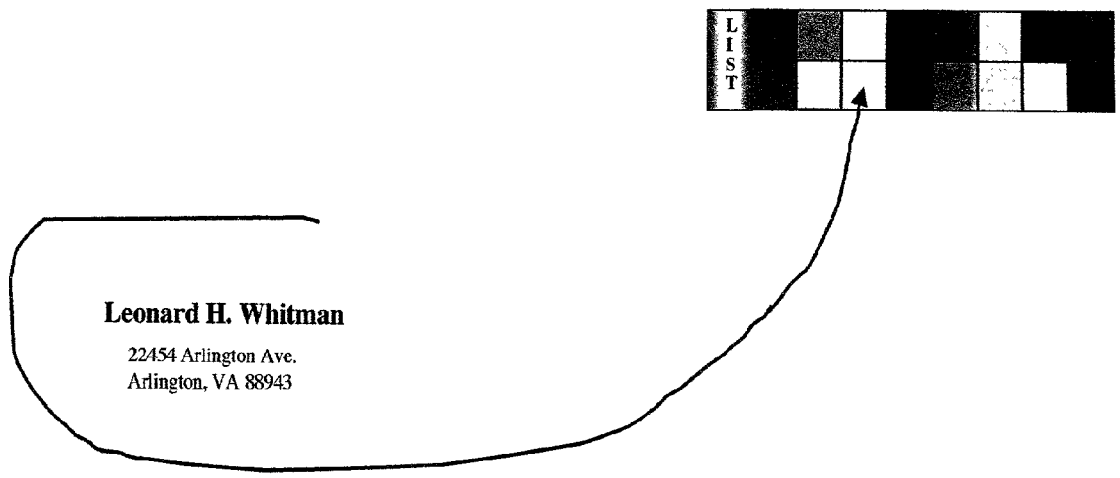
FIG. 10 is a screen view showing an arrow logic used to assign a text portion to a DRT color selection.

With regard to FIG. 10, a further assignment in the DRT system may involve using an arrow logic to assign a letterhead to the color light yellow. This assignment is labeled in the pop-up window as "letterhead for Leonard Whitman".

It may be appreciated that with the DRT system, the line color is only one way to assign an onscreen element to the DRT tool. In a more general sense, any convenient form of assignable line specifier may be used as a line property to which an element may be assigned. With regard to FIG. 24, the DRT system may be provided with a palette 51 of assignable line specifiers that do not involve color, although they may be combined with color to further multiply the assignment options. For example, row 52 of the palette 51 displays examples of line styles that vary from dashed to picket to gradient to solid line. Row 53 displays examples of various line textures, row 54 displays examples of various identifiable objects, and row 56 portrays letters (or numbers). Any of these palette items may have one or more onscreen elements assigned to it, using the same methods described herein with regard to the DRT color palette.

Figure 11:
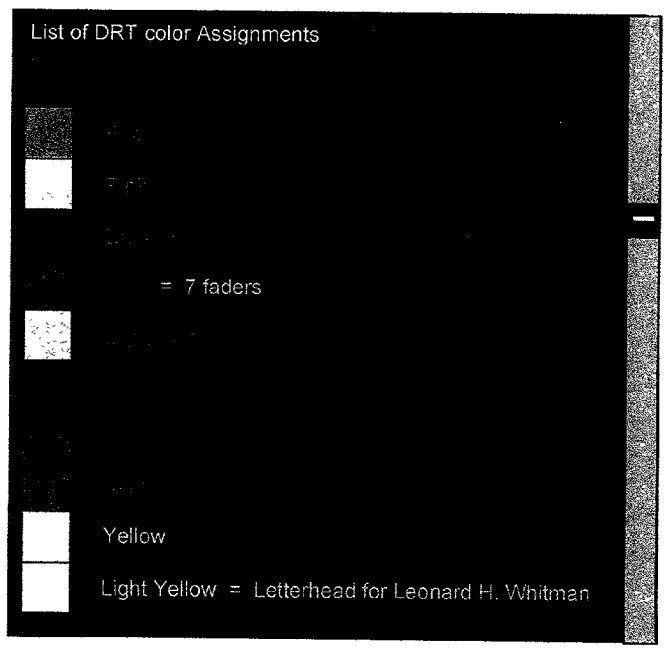
FIG. 11 is a screen view showing a list of color assignments for the DRT tool.
Figure 24:
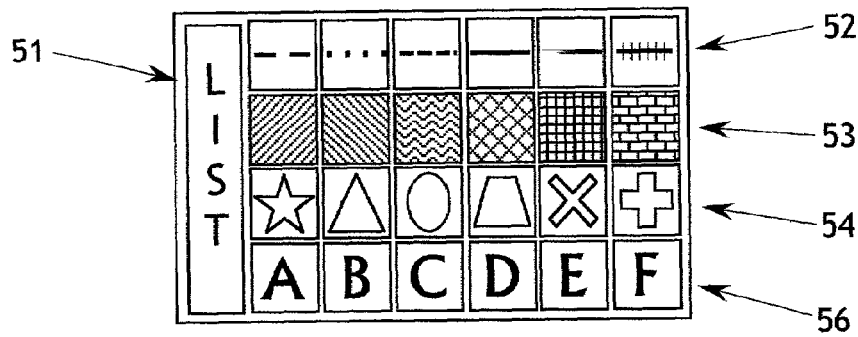
FIG. 24 is a depiction of a palette for displaying line specifiers, showing various examples of line specifiers.
Figure 25:
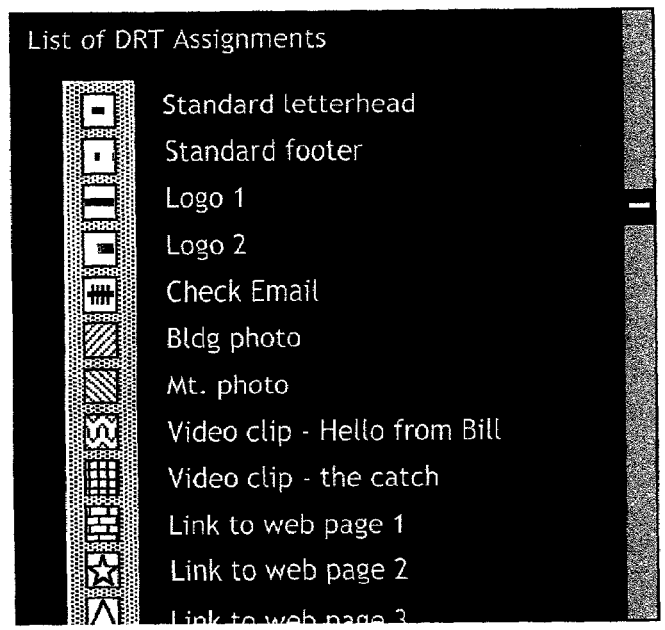
FIG. 25 is a depiction of a DRT Info Window corresponding to the line specifiers of FIG. 24.

The DRT Info Window for assignments, as shown in FIG. 25, is similar to the Info Window of FIG. 11, in that it equates each line specifier with its respective assignments. The process of implementing the DRT line specifiers of FIGS. 24 and 25 is very similar to the method described above. First, the user creates a DRT switch, and turns on the system. By double clicking or right clicking on the DRT switch, the DRT inkwell or palette 51 of FIG. 24 may be called forth and the user would then select an assignable line specifier from this inkwell. Thereafter, a line drawn will call forth the assigned element(s) assigned to this line specifier. For example, with regard to FIG. 26A, assuming that a three channel fader array has been assigned to the line specifier "A", the user draws the line 57. When the pen up (or mouse up) signal is received as the line 57 is completed (a DRT occurrence), the assigned element: the three channel fader array, appears onscreen. Its outer dimensions are determined by the length and slope of the drawn line.

Figure 26A:
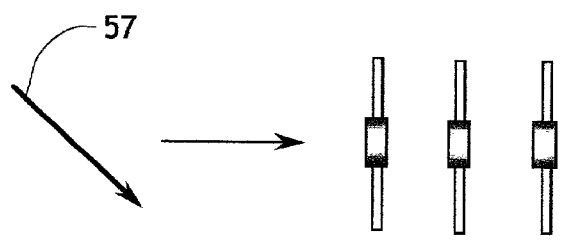
FIGS. 26A–26D are three views of different methods for displaying a line specifier as the DRT line is executed.
Figure 26B:

Likewise, a similar realization of the DRT, shown in FIG. 26B, involves the same steps leading up to drawing the line 57, except that there is no dashed letter displayed as the line 57 is drawn. When the line is completed (a DRT occurrence), the assigned line specifier "A" appears, and comprises an active switch element onscreen. Upon touching or clicking the "A", it disappears and is immediately replaced by an element assigned to the "A" specifier.

The line specifier "A" may be transmitted over a network or its equivalent to any other electronic device, where it will appear as an "A", and this character on the display of the recipient electronic device likewise may be activated to call forth the elements assigned to it. That is, the transmitted specifier also conveys the elements assigned to it.

Referring again to FIG. 26B, the "A" character may be considered to be the element, as the faders are in FIGS. 26A, C, and D. This "A" may be an object having other objects or devices assigned to it. Thus the drawing of a line would call forth onscreen the "A"(or any object having one or more assignments to it), where the "A" is the onscreen element. The difference here is that this onscreen element (A) has devices, actions, functions, etc. assigned to it which can be placed onscreen by touching or clicking on the "A". Thus this "A" element could be sent via a network and the germane material (assigned to "A") can remain hidden until the user of the recipient device decides to access that material. Various methods for assigning items to graphic objects are described in copending application Ser. No. 09/880,397, filed Jun. 12, 2001, entitled Arrow Logic System for Creating And Operating Control Systems.

Figure 26C:
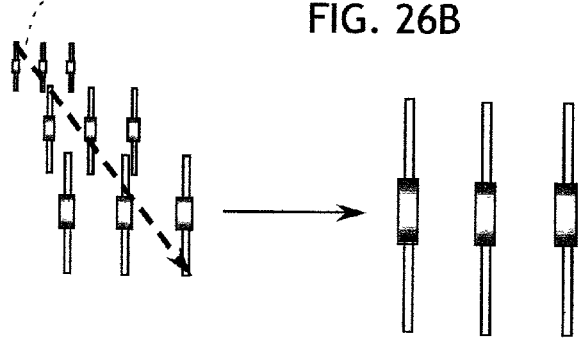

Another format for displaying the DRT, shown in FIG. 26C, also involves drawing the line 57. As the line is drawn, it is not displayed onscreen. Rather, the assigned element (the fader array) first appears as a small figure at the origin of the line, and then grows and expands as the line progresses, as suggested by the sequential size increase that is shown. Upon pen up or mouse up, the fader array is displayed at a size determined by the length and slope of the line 57.

Figure 26D:
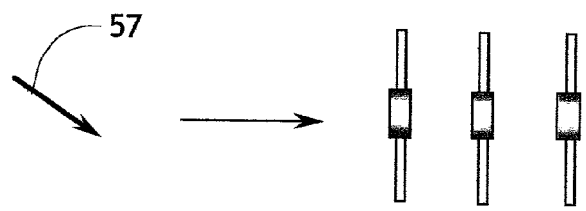

With regard to FIG. 26D, the user may select a line specifier, as before, and also select "Proportional OFF". Thereafter, when the user draws a DRT line of any length to call forth the assigned element, the element will appear at the same size as the original element. This size is not affected by the length or slope of the DRT line.

The display format of FIG. 2 may also be employed with these or any other line specifiers. Other formats for displaying this transaction may be apparent to those skilled in the art.

With reference to FIG. 4, the Info Window includes a toggle switch area labeled "Proportional ON," indicating that any element recalled by the DRT will be displayed completely displayed and proportionally sized according to the length and width of a DRT line or its equivalent. However, there may be circumstances in which it is preferred not to control the proportional size of an assigned element by the outer dimensions defined by a drawn DRT line or its equivalent. For example, when recalling a piece of text using the DRT tool, such as a paragraph from a text file, it is often desired to display the text in its original font size, margin parameters, line spacing, and the like. To generate a full size display, the user may first click or touch on the "Proportional ON" entry to toggle it to an OFF state. Thereafter, all DRT elements recalled are full size, unless and until the Proportional switch is once again toggled to the ON state. Note that when an element is recalled with Proportional OFF, the length and height of the diagonal drawn to call forth the DRT element does not determine the size of the display of the recalled element. Rather, the element appears in full size; that is, the same size as it was when it was assigned to DRT. Either the origin point or end point of the DRT line may set a boundary of the elements to be portrayed. The location of such boundary may determine the location of the upper left corner or lower right corner, etc. of the elements being displayed onscreen. The advantage of this feature is that the user may draw a short quick line to recall an element of any size, even one that fills the entire screen. The disadvantage of this feature is that the length and slope of the line cannot be used to resize or determine the size of the element being recalled.

At any time when the DRT tool is turned on, the user may click or touch the "List" or "L" rectangle of the DRT inkwell, as shown for example in FIGS. 8, to access a list of the DRT colors and their respective assignments. As shown in FIG. 11, this list will indicate, for the examples illustrated herein, that the color blue has had 7 faders assigned to it, and light yellow has had the letterhead of Leonard Whitman assigned to it. Note that the heading "Show Color Names" is a switch that may be touched to toggle on and off the display of the names of the respective colors, for example to aid those individuals with limited color vision. Also, this List Info Window may be used to select any color appearing therein to be the designated DRT color for a subsequent DRT rectangle. In this regard, it has the same function as the DRT inkwell.

Figure 12:
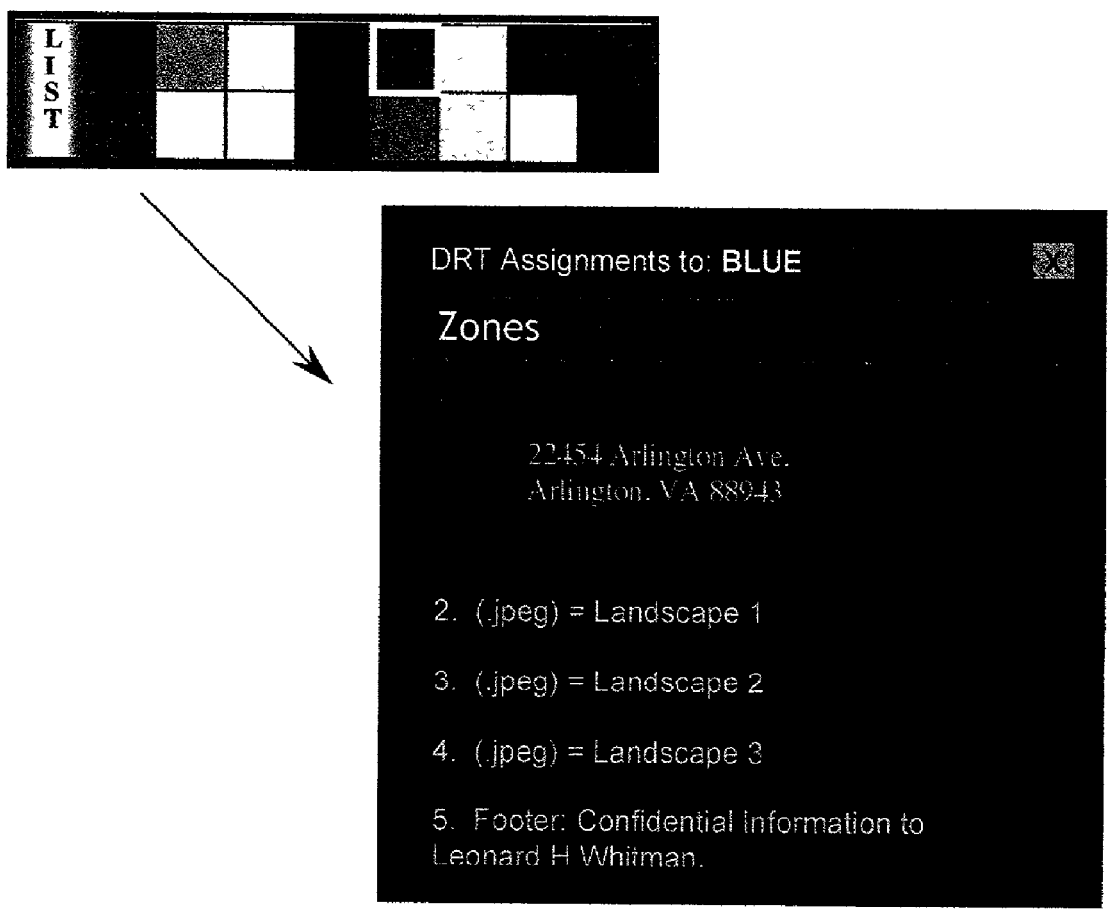
FIG. 12 is a screen view showing a technique for displaying the list of assignments of elements to a DRT color selection.

To further extend the scope of the DRT tool, provision is made to assign multiple elements to one color, although generally only one element would be recalled at one time. With regard to FIG. 12, when the DRT inkwell or palette is displayed, any color may be right clicked or double clicked on, after which the color rectangle is highlighted and the system calls forth a display of a list of elements assigned to that color. In the example of FIG. 12, the blue assignments include the aforementioned letterhead, three different jpeg pictures, and a text footer. The element that is active (the one that will be displayed when blue line is drawn with the DRT tool active) is the element that is highlighted; in this example, the letterhead for "Leonard Whitman." All the items in the list are operable; that is, any one may be clicked and selected to be the active element. Thus a large number of elements may be stored and easily recalled by the DRT tool.

Figure 13:
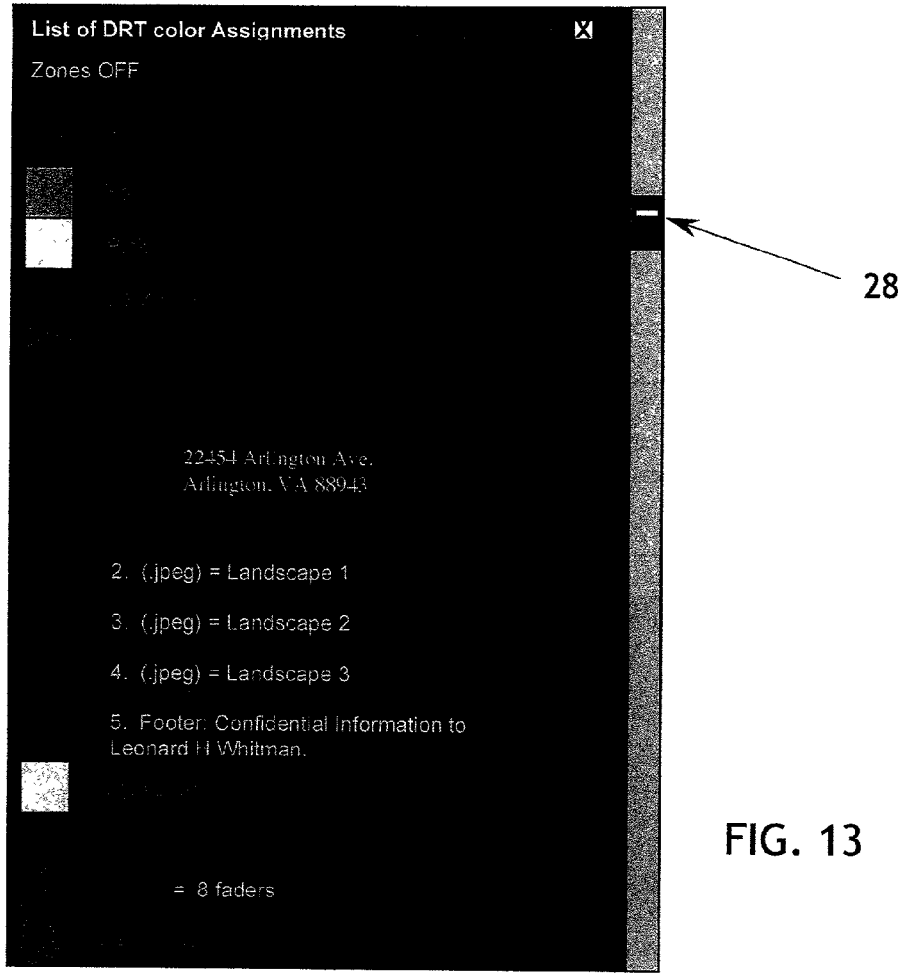
FIG. 13 is a screen view showing the list of DRT colors and their respective assignments.

In the Info Window of FIG. 11, the user may click on any one color rectangle to expand the window to display the assignments made to the selected color, as shown in FIG. 13. Note the scroll slider 28 that enables access to a long list of colors in a small Info Window.

Figure 14:
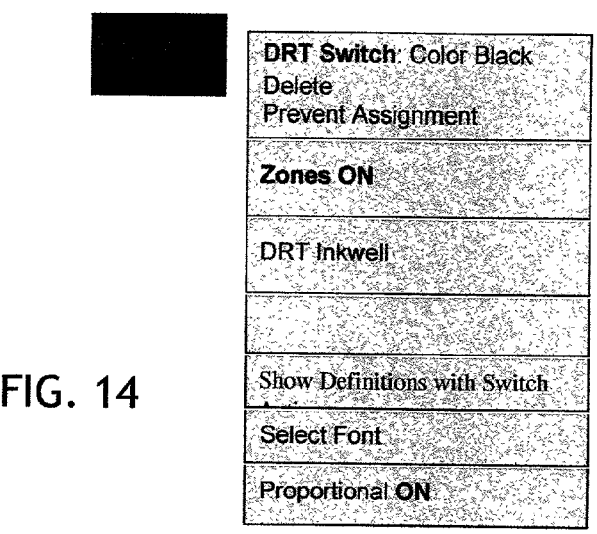
FIG. 14 is a screen view showing the DRT Info Window displayed with the Zones ON switch activated.
Figure 15:
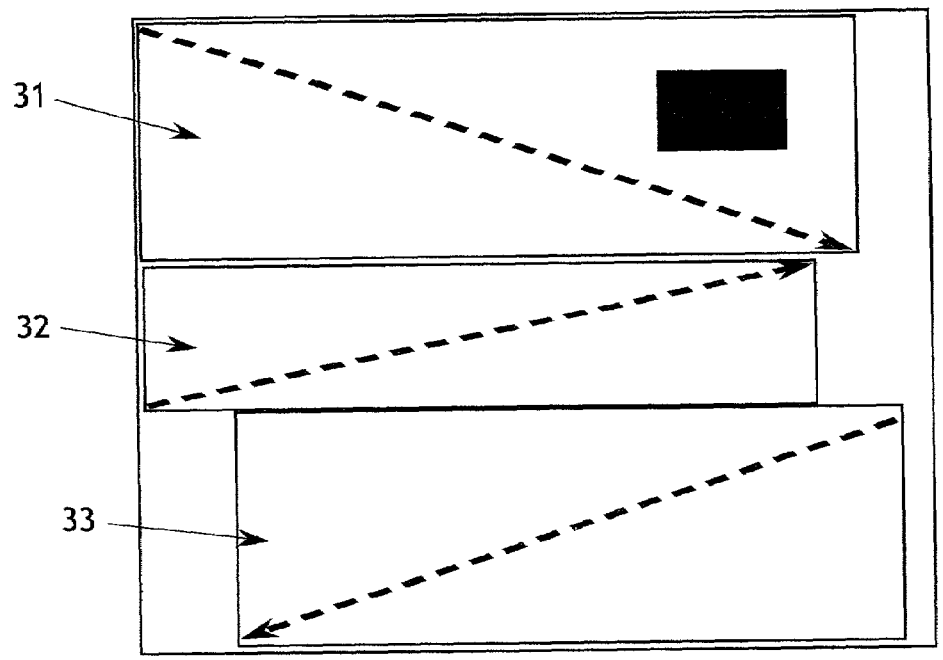
FIG. 15 is a screen view showing a technique for drawing a plurality of zones on the screen display.

Another important aspect of the DRT tool is the ability to provide zones on the display, which comprise delimited areas of the display, each area having its own unique set of DRT recognition conditions, available tools, and/or rules of operation. As shown in FIG. 4, after turning on the DRT system, the DRT Info Window includes an entry labeled "Zones OFF." This entry may be clicked or touched to turn On the Zones function, as shown in FIG. 14. Thereafter, a color or other specifier that has no zone assigned to it, such as blue in this example, is clicked on and thus selected.(Note that the color blue does have multiple elements assigned to it, but it does not have any zones assigned to it.) Then one or more diagonal lines are drawn (in any direction) across a selected portion of the display, as shown in FIG. 15, defining (in this example) three distinct zones 31–33. Note that the transitory diagonal lines are dashed blue, indicating the designation of zones, and that each zone is outlined by a rectangle whose size is determined by the diagonal that forms it. Also, the DRT switch continues to "float" above the zones display.

NOTE: If "Zones" has been turned on (in the DRT Info Window or in a DRT inkwell color's Info Window) then the zone assignment equals a behavior. If "Zones" is off then the assignment of the three boxes created by the three diagonal lines is in accordance with the user-defined assignments, as shown for example in FIG. 12. So, "Zones on" enables assigning "zones" to a DRT color, which zones will act as a behavior. With "Zones off", assigning "zones" to a DRT color will represent objects that will be recalled by drawing a DRT line onscreen. NOTE: if a color is selected as a line style where such color has no assignments of any elements made to it, a possible default operation (which is being referred to just above) is that drawing a line with a color that has no elements assigned to it will recall a window or its equivalent. This may be designated by a visible outline.

As a behavior, "zones" will enable a user to program a same colored diagonal line to be drawn in different zones and be used to recall different elements. In other words, a single colored DRT line can be used to recall completely different elements when this diagonal is drawn in different zones. To set up this type of operation requires having "Zones on" in the Info Window of the color for the DRT inkwell or in the Info Window for the DRT switch itself.

Figure 16:
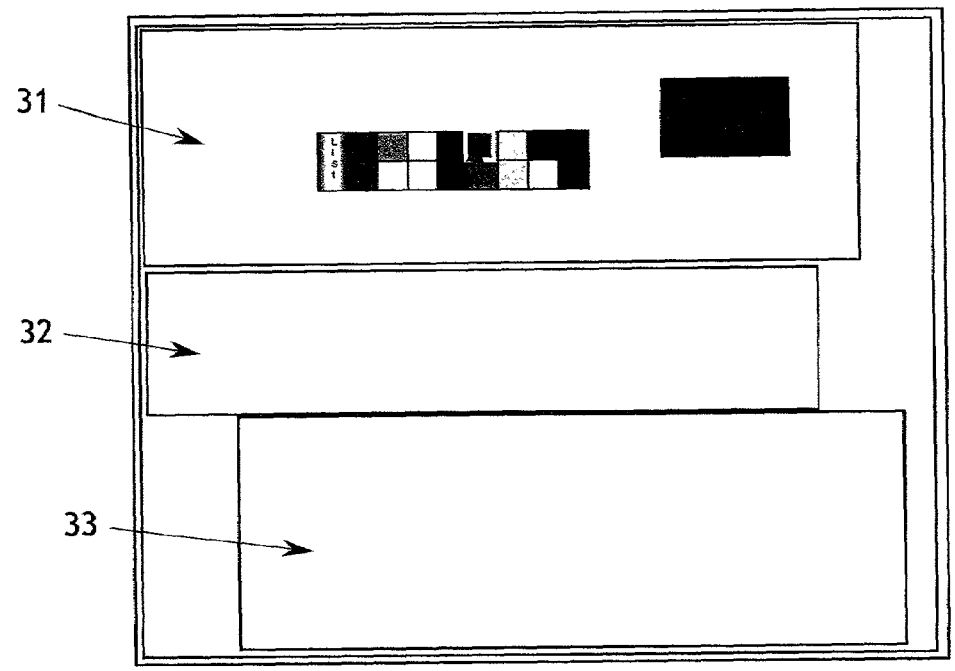
FIG. 16 is a screen view showing the zones resulting from the steps shown in FIG. 15 being assigned to a DRT color.
Figure 17:
Figure 17:
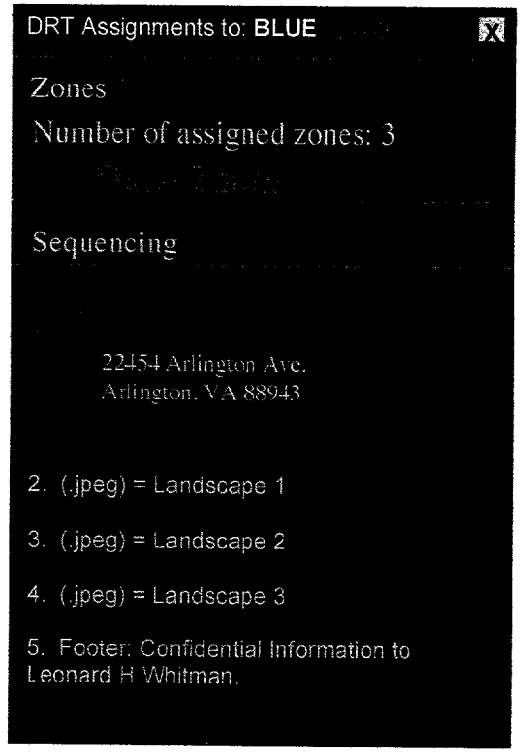

Shown in FIG. 16 are the three zones 31–33 that are being assigned as zones to the color blue in the DRT inkwell. To do this, right click on the DRT switch or its equivalent to see its Info Window. In its Info Window select "DRT inkwell". If this Inkwell has been previously selected (turned "on"), then it will already be visible onscreen. To assign these three zones (as zones and not as objects) to the color blue for the DRT, the following steps are taken: (1) Make sure that "Zones" is turned on in the Info Window for the color blue (FIG. 17). (2) Select an arrow color (for example, dark yellow) that conveys the logic transaction: "place every item that is visible onscreen and place these item(s) inside (assign them to) the object that the arrow is pointing to." (This arrow color is selected in the onscreen inkwell, not the DRT inkwell, (3) Draw a dark yellow arrow so that it points to the blue square in the DRT inkwell. With the mouse up click or the pen lift off, the arrow head turns white. Touch the white arrow head to confirm the transaction, and a dialog box will be displayed, and the zone combination can be named. Upon the mouse up click or pen off from touching the white arrow head, all three "zones" get stored in the color blue for the DRT. Finally, upon the up click or pen off, the three zones can, as a user option, disappear from onscreen, leaving the DRT and its inkwell visible.

NOTE: If the DRT switch changes color (changes the color of a perimeter rectangle appearing around the DRT switch) to indicated the currently selected color in the DRT inkwell, the user may make an assignment to this color by drawing a line/arrow so that the arrow head or end of the line overlaps or points to the DRT switch.

There are many methods to assign individual elements to a single color, using zones, in a DRT Inkwell (or Palette). In one method, the following steps may be taken: 1) Right click on a color in a DRT inkwell for which multiple elements have been assigned. This will call forth the Info Window for this color; 2) Turn on "Zones" in this Info Window for this color. In the case of this example, it's the color blue, (3) Assign "elements" that have been assigned to a given color (in this case, blue) to specific zones.

There are many ways to assign specific elements that were stored for the color blue to the zones that have been assigned to the color blue. Below are three of them:

1) Click to view zones in the Info Window for the color blue. When the zones appear, click and drag the element from the blue Info Window into the zone where you want a drawn blue DRT line to cause this element to appear. This action, of course, requires the user to remember where each zone is located onscreen, or to make the zones visible onscreen. One way to visualize each zone is to show an outline around the perimeter of the zone.

2) Make the element assignments to zones directly on the blue DRT inkwell Info Window. There are many ways to do this. As one example, type or hand print the word "Zone 1" or just "1" next to or on top of the blue element that you wish to see appear when you draw a blue diagonal in zone 1. This will have the same result as what is described under #1 above, as long as "Zones" is "on" in the Info Window for the color blue.

3) Perform the same steps as described under item 2 above, except first touch or click the desired element to select it and then say the name of the zone, e.g., "Zone 1" or "1", instead of typing or printing it. To assign other blue elements to other zones, type or say the name of the other zone, e.g., "Zone 2" or "2" for another element, and then "Zone 3", etc.

Figure 18A:
FIG. 18A and 18B are screen views showing the DRT list of assignments to the color blue, with Zones switched ON and Sequencing ON, and techniques for making assignments for sequencing and zones.

With regard to FIG. 18A, there is shown an example of typing "Zone 1" on the DRT Info Window for the color blue to assign an element (the letterhead) to Zone 1. Also illustrated is the typing of Zone 3 on the footer, and zones 2a–2c on the jpeg elements. Thus, it may be appreciated that when a user draws a blue diagonal line in Zone 1, the letter head for Leonard H. Whitman will appear. If, however, a blue diagonal line is drawn in Zone 3, a footer "Confidential Information to Leonard H. Whitman" will appear. One way of knowing which zone is being drawn in is to use the point of the first pen down or mouse click. Whichever zone contains this point is the zone that determines which element will be recalled with a drawn diagonal line.

Figure 18B:
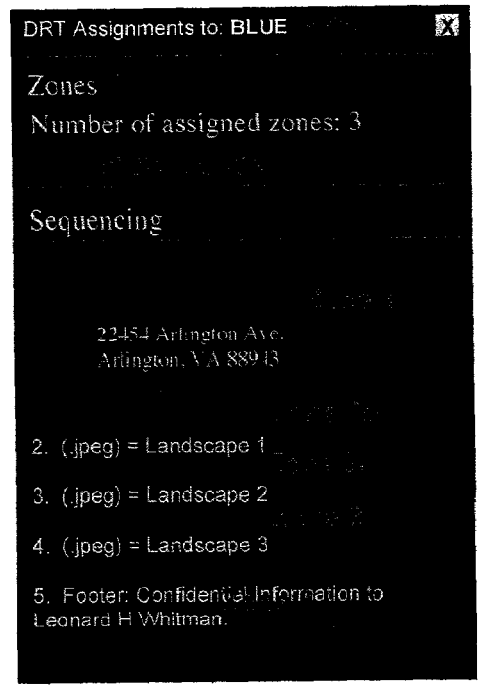
Figure 18B:
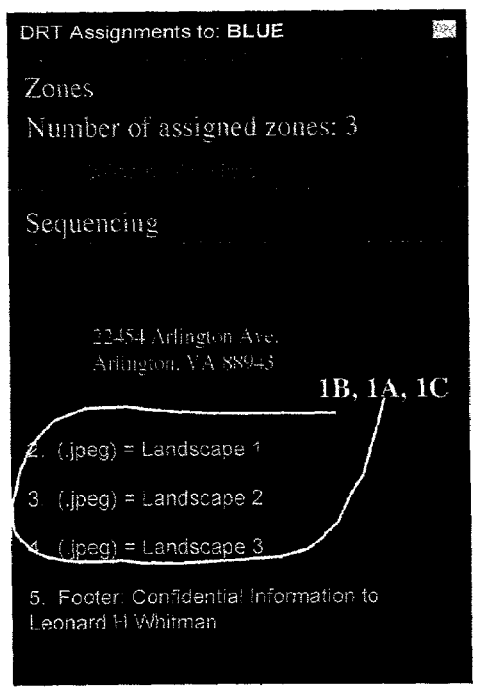

A further, powerful aspect of the DRT system is that multiple elements can be sequenced for a single colored DRT line for a single zone, so that repeated use of a DRT diagonal line of a particular color causes a series of assignments to be made in a preset order. Continuing in FIG. 18B with the example of FIG. 18A, the user may wish to draw more than one blue DRT line in more than one location in Zone 2. In other words, when the first blue diagonal is drawn in Zone 2 one type of picture appears (whose height and width are governed by the length and angle of the drawn blue diagonal line). Then when a second blue diagonal line is drawn in Zone 2, a different picture appears, and so on. This is an example of auto-sequencing for elements assigned to a single color for a single zone.

To implement auto-sequencing of elements for a single color in a single zone, (consider the three different pictures for Zone 2 for the color blue), the following steps are taken: (1) Turn "Sequencing" on in the Info Window for the color blue for the DRT, (2) then Type Zone 2 over or near the first element that is to be sequenced in Zone 2. Then with the Sequencing feature still "on" in the blue Info Window, touch the next elements that you want to appear with each new blue diagonal line drawn in Zone 2. As each element is touched is will get a sub-number to indicate its order of sequence selection, (3) draw three blue diagonal lines in Zone 2 and you will see the three different pictures that were sequenced to Zone 2 appear.

An alternate approach to the sequencing of the three pictures would be to drag each picture to Zone 2 in the order that you want them to appear when you draw multiple blue diagonal lines in Zone 2.

Another alternate approach would be to draw an ellipse around a number of elements (in this case pictures) that were assigned to a specific DRT color or specifier. Then type or print a sequence of numbers or letters or a combination of both, i.e., 1–3 or 1, 3, 2 or A–C or B, A, C, or 1A to 1C, etc., close to or overlapping the selected elements. This technique, illustrated in FIG. 18B, will sequence these elements for the color they are assigned to. Note: if only one element has been assigned to a zone, even if sequencing is on, only that element will be recalled.

Note: If the user wishes to see a graphic outline of the zones (i.e., as shown in FIG. 16) that have been assigned to the color blue as a behavior, the following steps are taken: Click on the "Show Zones". When this is selected, a graphic outline of each assigned "behavior" zone will appear onscreen. This is a necessity for users who wish to assign elements to zones by dragging duplicates of these elements into a zone of their choice. It would be difficult to drag to zones that are not visibly defined.

Note: When an element is dragged from a DRT color or specifier Info Window to a zone, this element is automatically duplicated and is generally not removed from the Info Window. A duplicate is dragged for programming purposes. On the mouse up click, this duplicate disappears from the Zone to which it was dragged and the text "Zone 1, Zone 2, Zone 3, Zone 4", etc., appears next to the element that was just duplicated and dragged to a particular zone.

Figure 19:
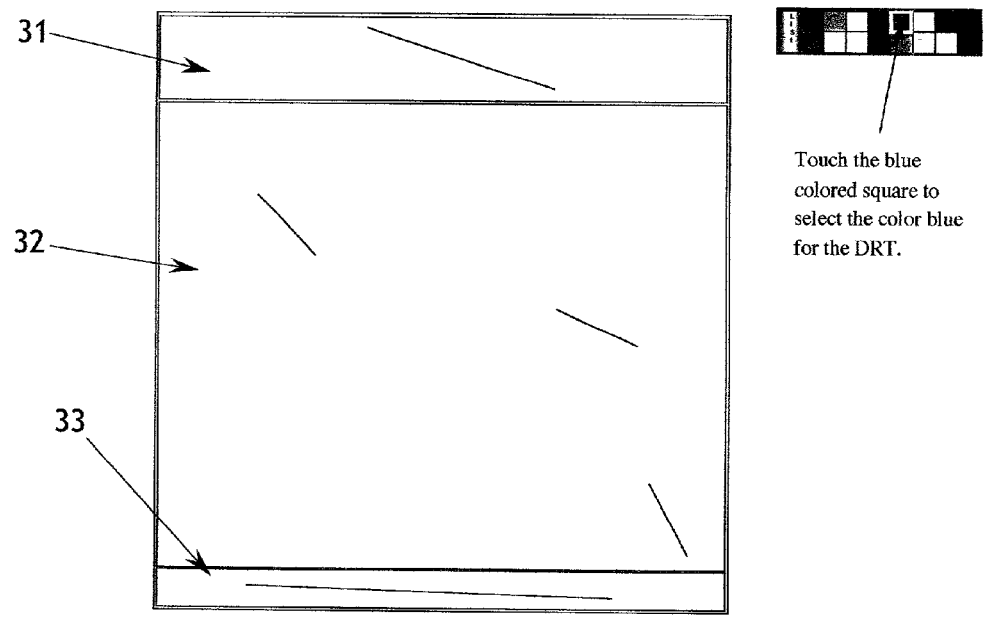
FIG. 19 is a screen view showing the zones portrayed previously and DRT elements being placed in each zone.
Figure 20:
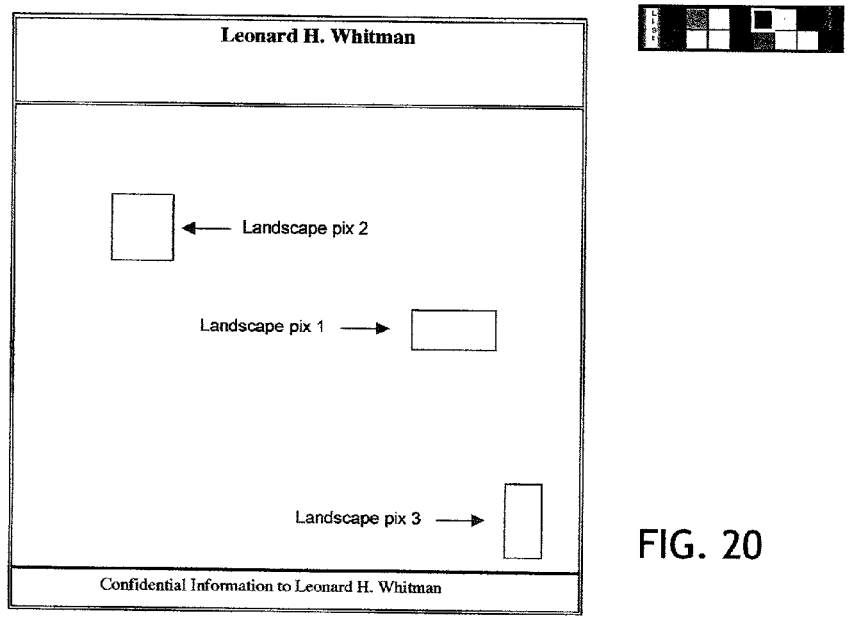
FIG. 20 is a screen view showing the results of the DRT placements of FIG. 19.

With regard to FIGS. 19 and 20, the result of the setting up of three zones for the color blue as described above is three zones 31–33, although they need not be visible to be functional and, in fact, users may opt not to have these zones be visible. If the user is creating a letter, first select the color blue in the DRT inkwell. Then draw a blue DRT line in Zone 1. This places the letterhead for the letter. If it is desired to place the letter head in the middle between the page margins, draw the diagonal in the middle of the zone, or to the left or right for placing the letter head in those locations. Five blue diagonals have been drawn, a task that requires about 5 seconds or less, and the resulting effect, shown in FIG. 20, is quite significant. In fact, the use of DRT lines with zones eliminates a significant amount of accessing of menus, selecting of options, resizing of objects (if this resizing is even possible in an existing software program), setting up margins, etc, that are required in state of the art computer applications. All of these functions, which are necessary on every PC, are eliminated with the DRT and its zones feature.

Note: Continuing to type text or add graphics to the zone, where the vertical height of that zone is exceeded, many results are possible. One possible result is that a scroll bar or its equivalent can appear for that zone. In this latter case, a zone can be extended into pages of text, rather than being limited to one page whose text is scrolled through. And in this latter case, a scroll bar will appear to enable scrolling through pages, as in prior art word processing programs.

Figure 21:
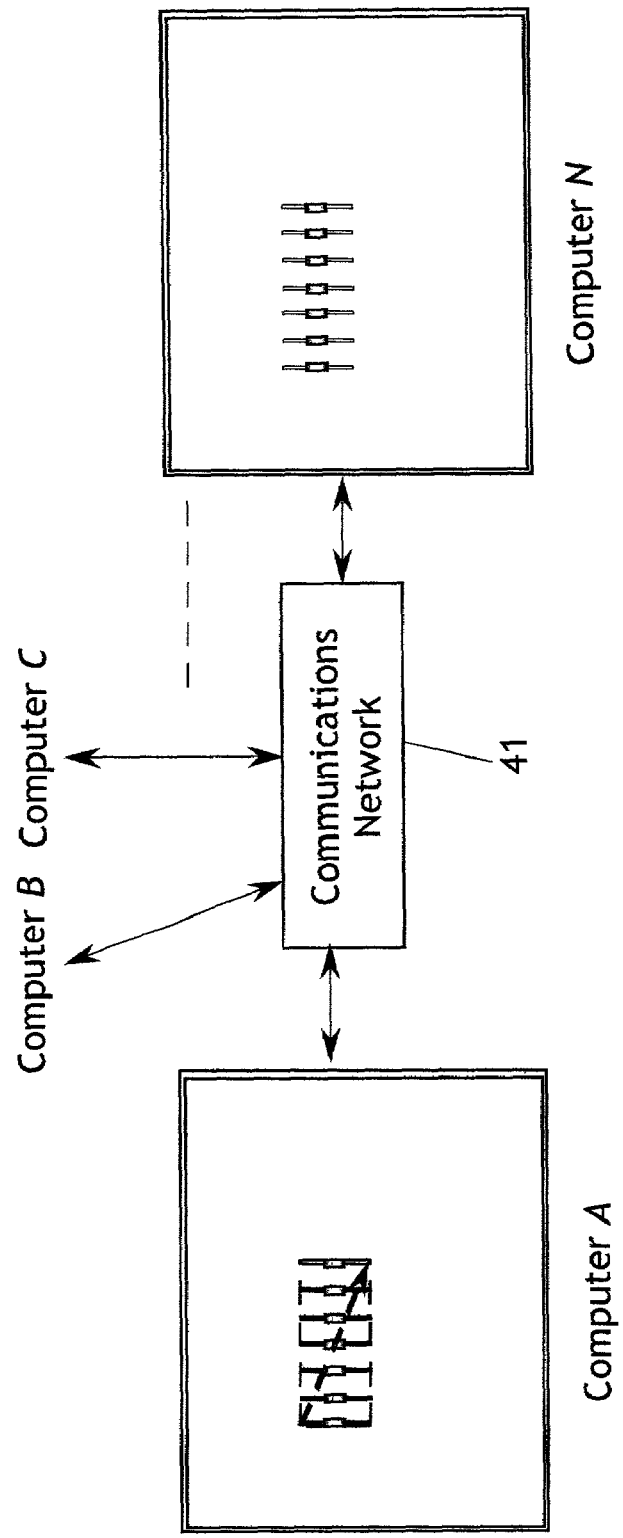
FIG. 21 is a block diagram showing a plurality of computers connected to a network for sharing DRT elements, such as a fader switch array.

With regard to FIG. 21, a further aspect of the invention is the ability of more than one computer to share DRT tool elements, transactions, and manipulations. A plurality of computers A, B, . . . N are connected to a communications network 41, which may comprise an intranet, Ethernet, internet, wireless data network, or any equivalent facility that enables signal transmission and exchange between the computers. Each computer is provided with software that includes the DRT function as described herein, as well as the arrow logic capability, character recognition capability, pen-based graphic text editing, and related elements described in the preceding related applications referenced above.

Any two or more computers connected to the network 41 may be linked for real-time interchange of elements handled by the DRT system. For example, computers A and N may be linked by a selective handshake routine implemented by the respective computer users. Thereafter, for example, the user of computer A may draw a DRT diagonal to call forth an array of faders, as indicated by the blue dashed line in FIG. 21. At the same time, the same fader array with the same outer dimensions also appears on the screen of computer N. It is significant to note that the fader array displayed on computer A are active elements that may be manipulated to change levels, arrange or rearrange inputs, and the like. Likewise, the fader array communicated to computer N is as fully operational as the array drawn on computer A. Thus active elements may be conveyed directly between these machines using the DRT.

Figure 22:
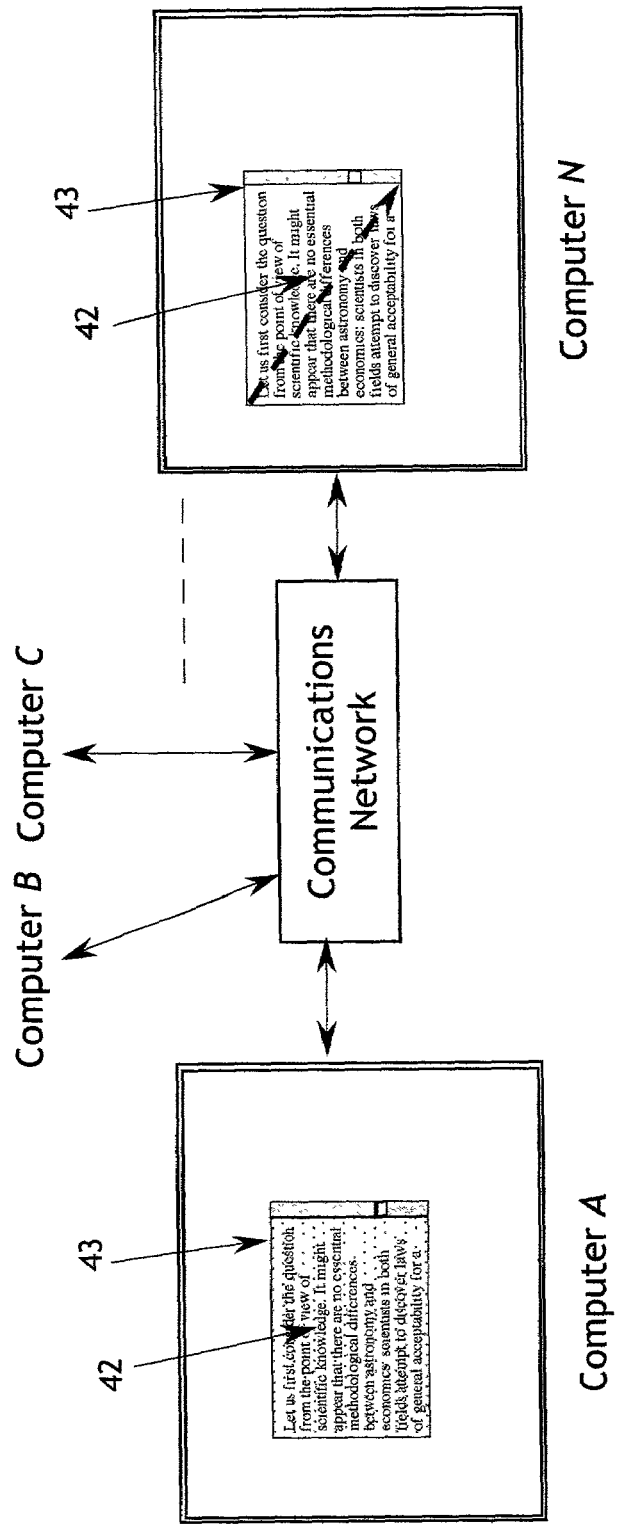
FIG. 22 is a block diagram showing a plurality of computers connected to a network for sharing DRT elements, in this example a text element.

As another example, the steps shown in FIGS. 19 and 20 to construct a letter or similar communication may be transmitted between two or more computers on the network 41, each DRT stroke being transmitted as it is carried out. The recipient computer(s) are enabled to transmit onscreen DRT strokes and the like as a reply to any computer from which a DRT element has been received. For example, as shown in FIG. 22, the user of computer N may use a DRT tool to call forth a text portion 42 that has been stored in a window 43, so that the text may be scrolled to display it entirely. This text portion 42 and window 32 will appear at the same time on the display of computer A. Each text portion on each computer may be scrolled separately. The ability to share files between computers enables truly interactive communications among the computer users, in that any user may contribute elements to the onscreen display, and may see the results of the contributions of other users.

Figure 23:
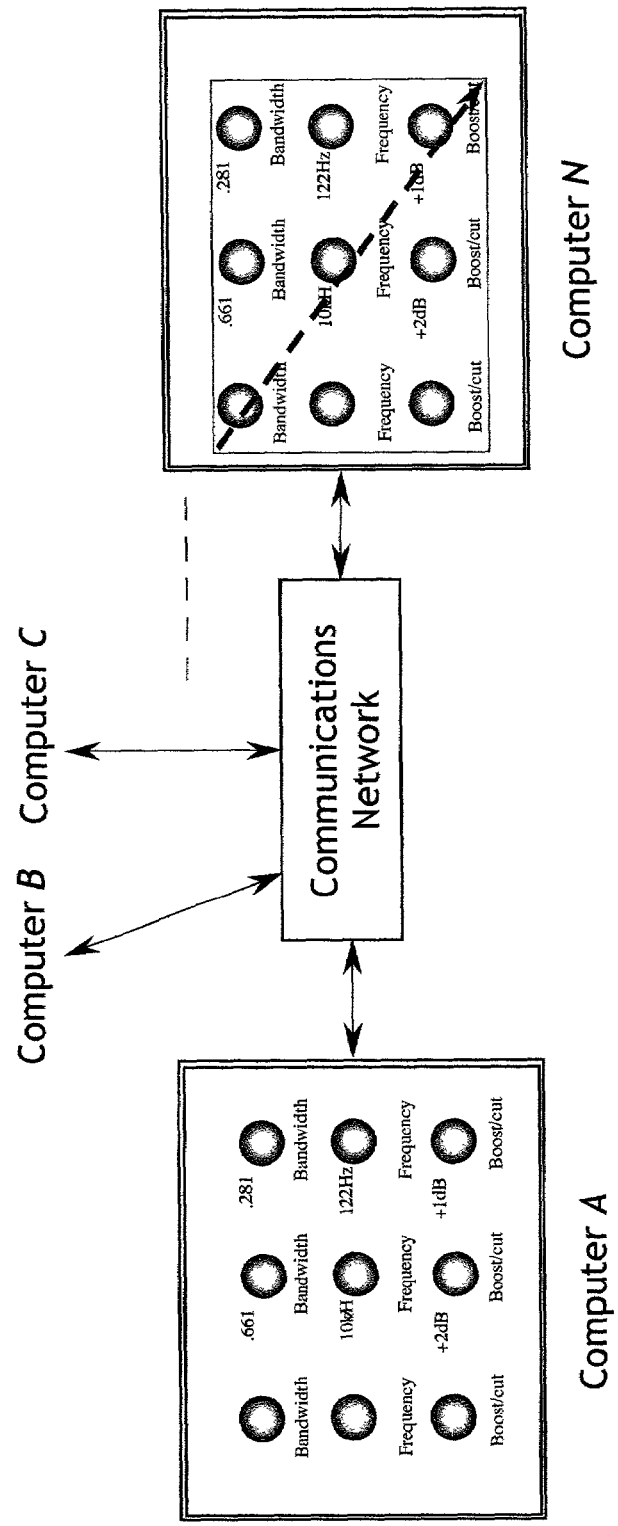
FIG. 23 is a block diagram showing a plurality of computers connected to a network for sharing DRT elements, in this example a three channel audio processor.

As a further example, shown in FIG. 23, the user of computer N may use a DRT stroke to recall a three channel audio processor, an active element that can be directed to receive audio inputs and produce individually processed audio outputs. This entire audio processor comprises one DRT element that is transmitted to computer A; after transmission and reception, computer A uses software code to generate the active device(s) that the (newly received) onscreen graphic elements represent. Computer A may then operate the three channel audio processor independently of the computer N; that is, the audio processor now resides independently in computer A and N.

Using a link (i.e., a network) between two or more computers enables a user to use his DRT function to "deliver" fully operational devices, controls, systems, graphic and text presentations and the like to others on the network by simply drawing a diagonal. Furthermore, very complicated consoles or test equipment and the like can be constructed at one location and then assigned to a DRT. The construction of such consoles, etc. can utilize recognized objects as described in patent application Ser. No. 09/785,049, filed Feb. 15, 2001 entitled: Method For Creating And Operating Control Systems. Then by drawing a DRT line onscreen when linked to other computers, this "equipment" can be conveyed to anyone on the network. The equipment is delivered as graphic information which presents various operations, assignments, etc. Once received, this graphic assignment information is converted into a complex piece of equipment. This operation enables sending complex equipment while utilizing very little bandwidth.

This system is not limited to DRT elements, but may include arrow logic transactions and the like. Thus the computers linked through network 41 are empowered to conduct fully interactive exchanges in real time.

To summarize, the primary advantages of the DRT system are:

Increased speed of operation;

Total customization of the onscreen environment and of the user's operational protocols;

The substantial elimination of traditional pull down menus, margins, tabs, and other time consuming and difficult-to-control setup procedures and requirements;

Greatly improved operation and control over the creation of mixed media, i.e., pictures, video and audio with text, customized devices, etc.;

The elimination of required orders of operation (other than sequencing with DRT lines), required graphic tools, i.e., grab boxes, select tools, etc. (which obscure the clarity of the very objects [elements] that are placed onscreen) and all kinds of protocols and rules which must be learned in order to create a simple document with mixed media;

The ability of multiple users to transmit and share any element, however complex, that is presented or operated onscreen.

The foregoing description of the preferred embodiment of the invention has been presented for purposes of illustration and description. It is not intended to be exhaustive or to limit the invention to the precise form disclosed, and many modifications and variations are possible in light of the above teaching without deviating from the spirit and the scope of the invention. The embodiment described is selected to best explain the principles of the invention and its practical application to thereby enable others skilled in the art to best utilize the invention in various embodiments and with various modifications as suited to the particular purpose contemplated. It is intended that the scope of the invention be defined by the claims appended hereto.

What is claimed is:

1. In an electronic device that accepts drawn graphic entries and includes a screen display, a tool for storing and recalling elements displayed on the screen, including the method steps of:

providing means for displaying at least one assignable specifier;

the user assigning at least one onscreen element to a respective assignable specifier;

selecting said respective assignable specifier as a line style;

drawing a line onscreen in said line style to call forth said assignable specifier;

the screen display thereafter portraying said at least one onscreen element assigned to said assignable specifier.

2. The method of claim 1, wherein said at least one onscreen element is scaled to be displayed at a size proportional to the length and slope of said line.

3. The method of claim 1, wherein the said line is irregular.

4. The method of claim 1, wherein said at least one onscreen element is displayed in a window, said window being scrollable to view the entirety of said at least one onscreen element.

5. The method of claim 1, wherein said at least one onscreen element is scaled to be displayed at a size substantially the same as it was when assigned to said respective assignable specifier.

6. The method of claim 1, wherein said at least one onscreen element comprises active element means capable of carrying out a functional operation.

7. The method of claim 1, wherein said at least one onscreen element includes a text portion.

8. The method of claim 1, wherein said at least one onscreen element includes an audio portion.

9. The method of claim 1, wherein said at least one onscreen element includes a video portion.

10. The method of claim 1, wherein said at least one onscreen element includes a graphic portion.

11. The method of claim 1, further including the step of displaying a palette showing at least one line specifier.

12. The method of claim 11, wherein said step of assigning at least one onscreen element includes drawing an arrow from said at least one onscreen object to said at least one line specifier.

13. The method of claim 11, further including the step of displaying essentially all assignments of onscreen elements that are made to each line specifier.

14. The method of claim 13, wherein said step of displaying essentially all assignments includes selecting and activating any of said line specifiers displayed by said palette means.

15. The method of claim 11, wherein said palette displays at least one specifier selected from groups that include colors, textures, line types, object symbols, and alphanumeric characters.

16. The method of claim 1, wherein said step of assigning at least one onscreen element includes the step of naming each assignment.

17. The method of claim 1, further including means for turning said tool on and off.

18. The method of claim 17, wherein said means for turning said tool on and off is accessed by drawing an onscreen graphic command for a digital recall tool switch.

19. The method of claim 18, wherein said onscreen graphic command comprises a pair of nested rectangles.

20. The method of claim 1, further including the step of defining at least one zone on said screen display, said at least one zone having separate and unique assignments of onscreen elements to said line specifiers.

21. The method of claim 20, further including the step of displaying a zones Info Window, and means in said zones Info Window for turning said zones on and off.

22. The method of claim 20, further including the step of displaying a selected line specifier Info Window to show each assignment made to said selected line specifier.

23. The method of claim 22, further including the step of allocating in said line specifier Info Window at least one of said zones to at least one of said elements assigned to said selected line specifier.

24. The method of claim 20, further including the step of displaying a zones Info Window, and means in said zones Info Window for assigning at least one element to a zone.

25. The method of claim 1, further including the step of assigning a plurality of onscreen elements to a line specifier, and selecting which of said plurality of onscreen elements is to be recalled by drawing said line.

26. The method of claim 1, further including the step of assigning a plurality of onscreen elements to one line specifier, and thereafter drawing a plurality of said lines, each line recalling a respective one of said plurality of onscreen elements in accordance with a user-definable sequence.

27. The method of claim 1, further including providing a plurality of said electronic devices, connecting said devices through a communications network, and transmitting said at least one element from one of said electronic devices to at least another of said electronic devices.

28. The method of claim 27, wherein said at least one onscreen element represents a functional object, said another of said electronic devices thereafter generating said functional object to reside therein.

29. In an electronic device that accepts drawn graphic entries and includes a screen display, a tool for storing and recalling elements displayed on the screen, including the method steps of:

providing means for displaying a plurality of colors;

the user assigning at least one functional onscreen element to at least one of said plurality of colors;

selecting said at least one color as a line style;

drawing a line onscreen using said at least one color;

wherein screen display portrays said functional element that is assigned to said at least one color.

30. The method of claim 29, wherein the length and slope of said line determine the size of said element.

31. The method of claim 29, wherein said at least one onscreen element is scaled to be displayed at a size substantially the same as it was when assigned to said at least one of said colors.

32. The method of claim 29, further including the steps of providing a plurality of said electronic devices, connecting said devices through a communications network, and transmitting said onscreen element from one of said electronic devices to at least another of said electronic devices.

33. The method of claim 32, said another of said electronic devices receiving said functional onscreen element and thereafter generating said functional onscreen element to reside and operate in said another electronic device.

34. In an electronic device that accepts drawn graphic entries and includes a screen display, a tool for storing and recalling elements displayed on the screen, including the method steps of:

providing means for displaying a first plurality of colors;

the user assigning at least one representational onscreen element to one of said first plurality of colors;

selecting said one of said first plurality of colors as a line style;

drawing a line onscreen using said one color, the screen display portraying said representational element assigned to said color.

35. The method of claim 34, wherein said at least one representational onscreen element is displayed at a size that is determined by the length and slope of the line drawn.

36. The method of claim 34, wherein said assigning step includes using an arrow logic line to assign said at least one representational onscreen element to said one of said first plurality of colors.

37. The method of claim 36, wherein said assigning step includes displaying a second plurality of colors for arrow logics, and selecting an arrow logic color from said second plurality of colors that corresponds with the transaction defined as taking the onscreen objects from which the line is drawn and placing those objects in the object to which the line is drawn.

38. The method of claim 37, wherein said object to which the line is drawn is said one of said first plurality of colors.

39. The method of claim 37, further including the step of transferring at least one of said second plurality of colors to said first plurality of colors.

40. The method of claim 34, wherein said assigning step includes the serial actions of first selecting one of said first plurality of colors, and thereafter selecting said at least one representational onscreen element.

41. In an electronic device that accepts drawn graphic entries and includes a screen display, a method for storing and recalling elements displayed on the screen, including the steps of:

providing means for displaying at least one assignable specifier;

the user assigning at least one onscreen element to a respective assignable specifier;

selecting said respective assignable specifier as a line style;

drawing a line onscreen in said line style to call forth said respective assignable specifier;

the screen display thereafter portraying said respective assignable specifier;

activating said respective assignable specifier to call forth said at least one onscreen element which has been assigned to said respective specifier.

42. The method of claim 41, further including providing a plurality of said electronic devices, connecting said devices through a communications network, transmitting said respective assignable specifier from one of said electronic devices to at least another of said electronic devices; and, displaying said respective assignable specifier by said another of said electronic devices.

43. The method of claim 42, further including the step of activating said respective assignable specifier on said another of said electronic devices to call forth said at least one onscreen element.

* * * * *